Patented June 2, 1942

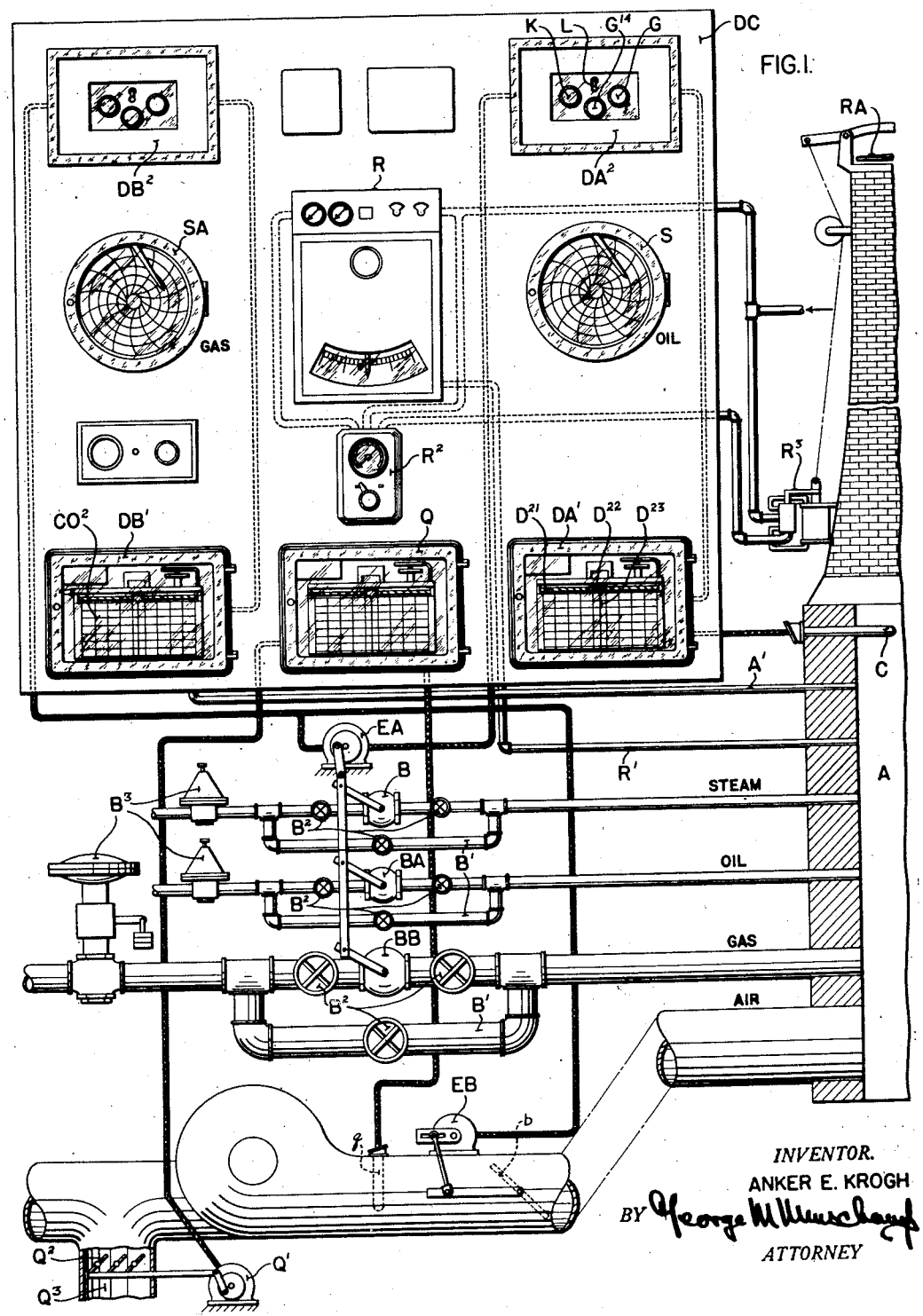

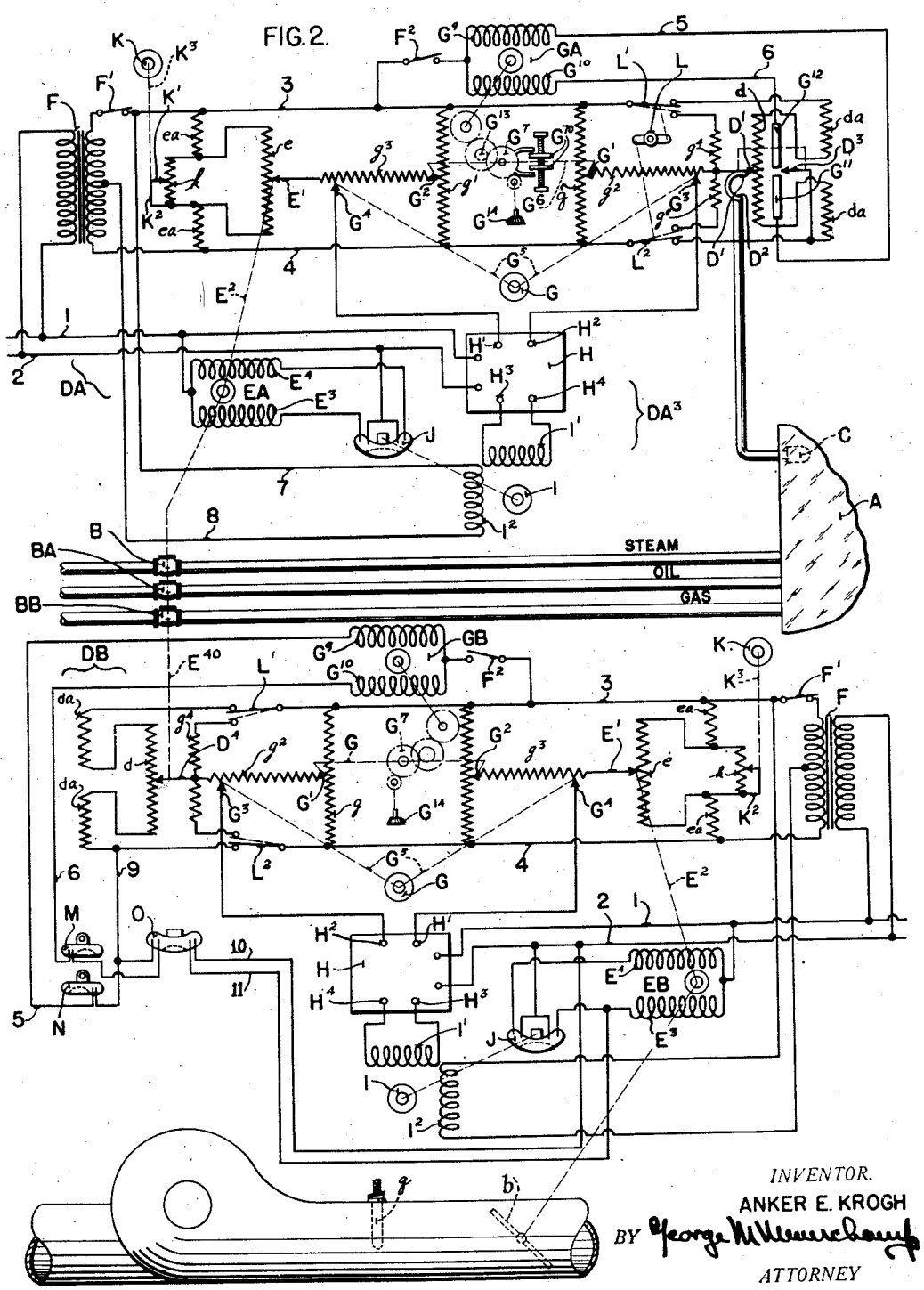

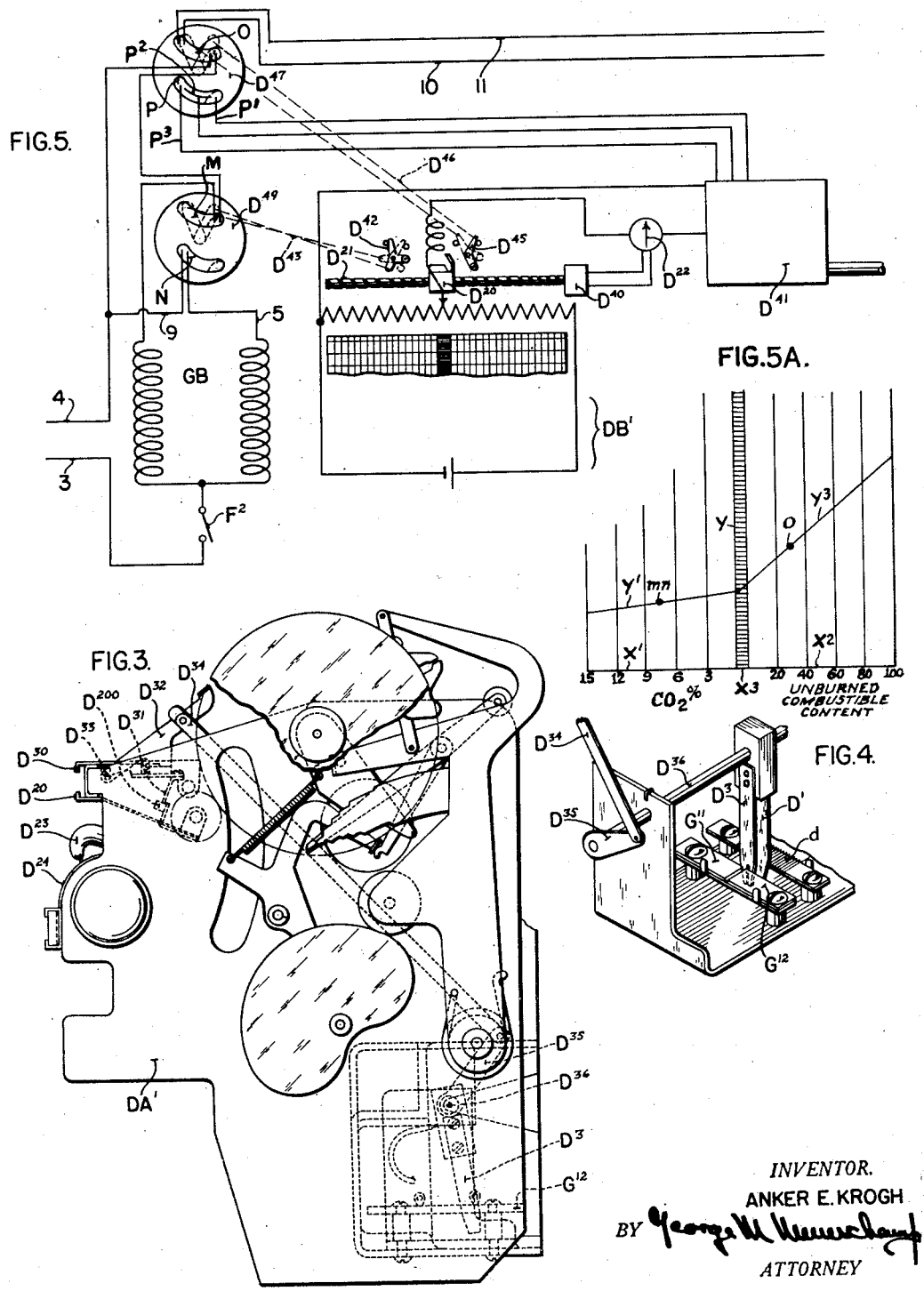

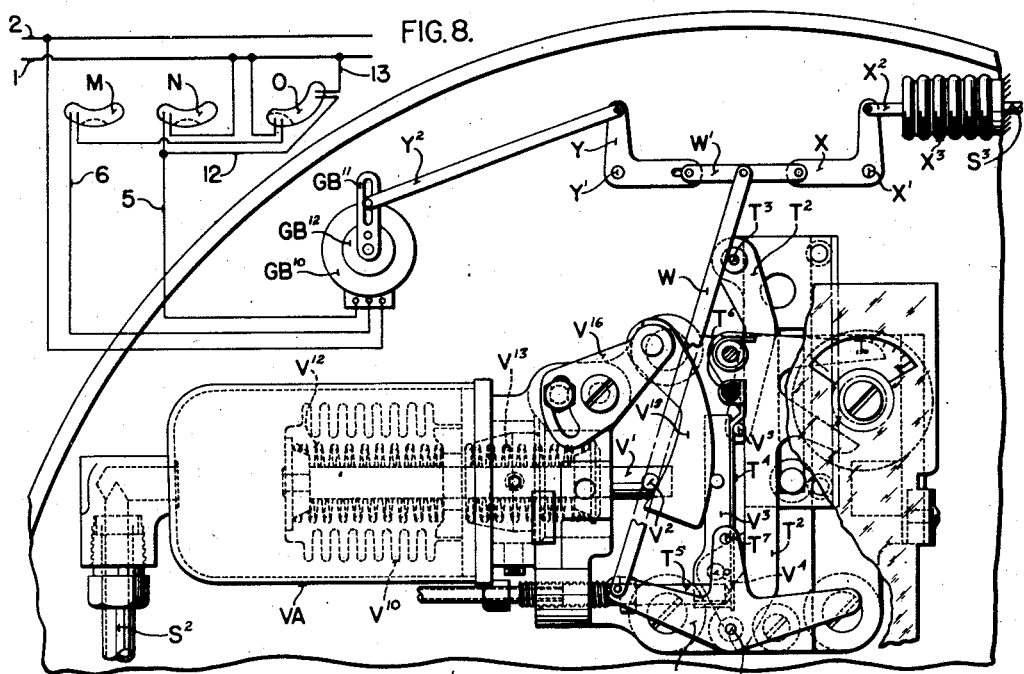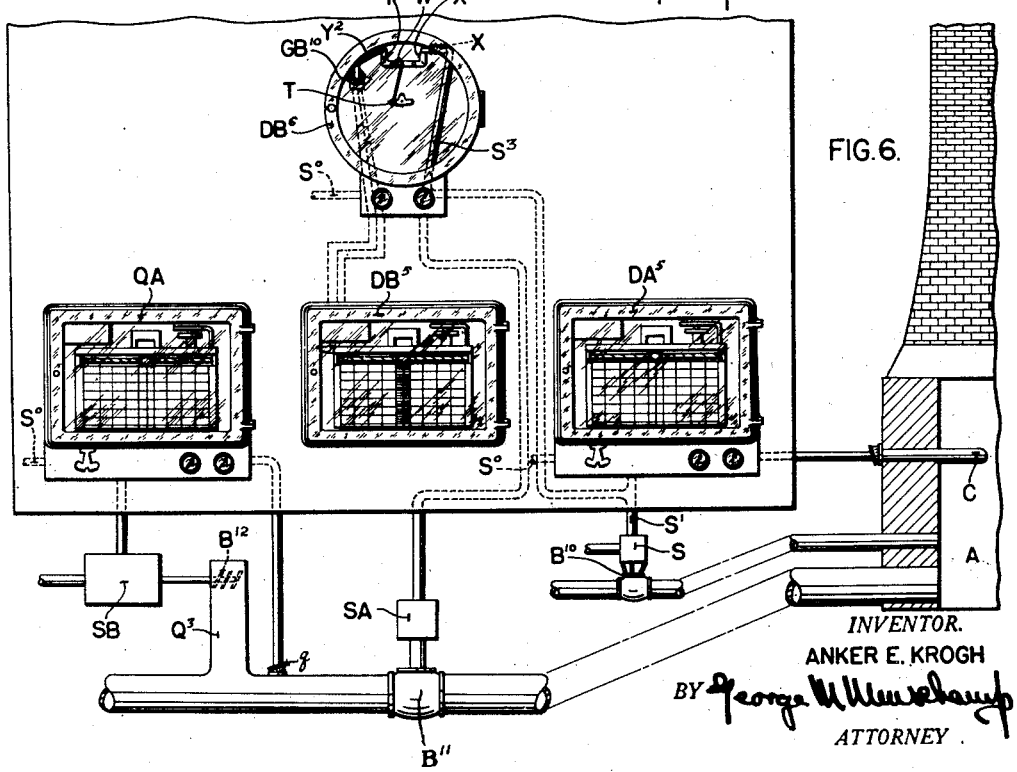

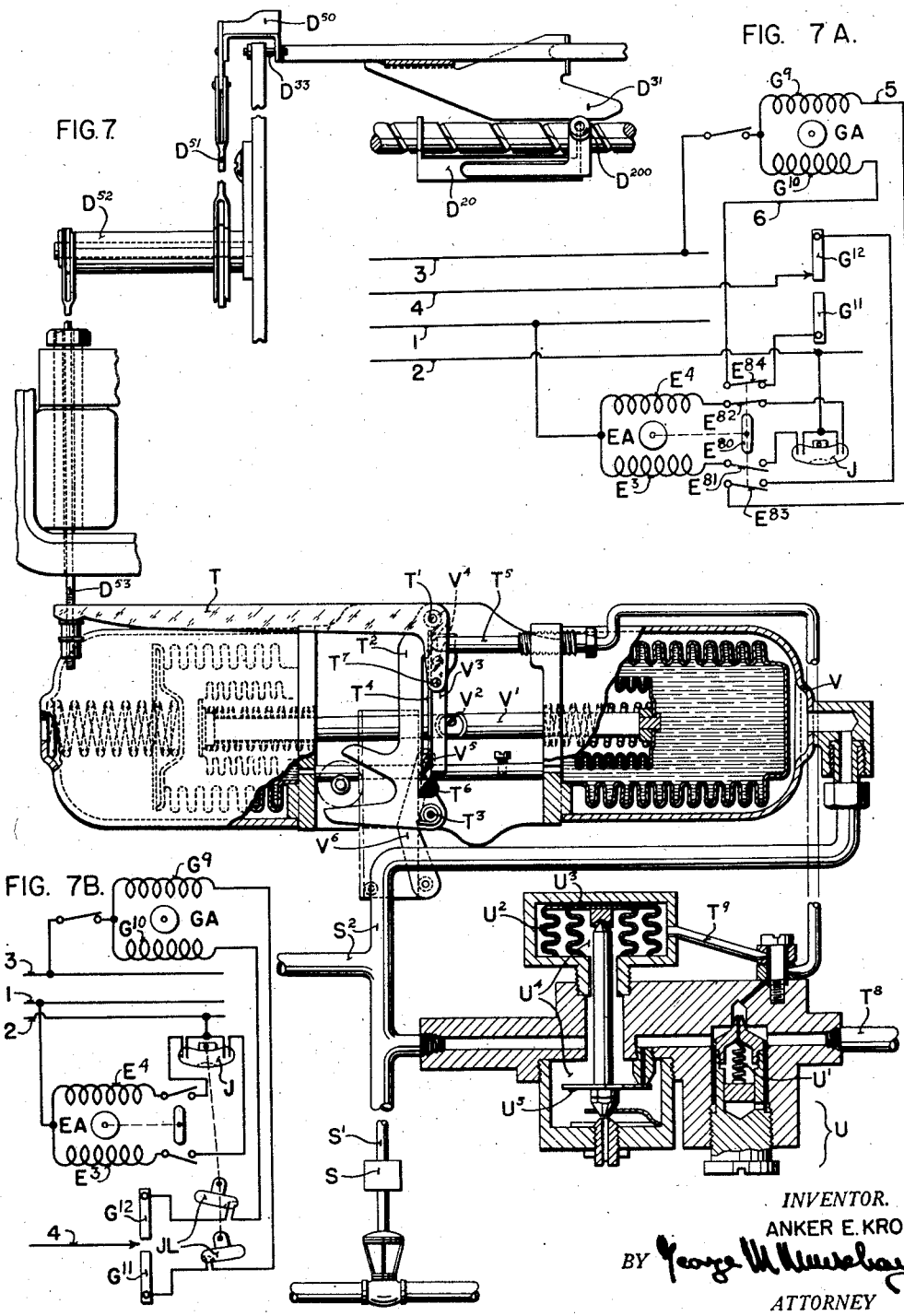

2,285,287

UNITED STATES PATENT OFFICE 2,285,287

AUTOMATIC CONTROL APPARATUS

Anker E. Krogh, Philadelphia, Pa., assignor to The Brown Instrument Company, Philadelphia, Pa., a corporation of Pennsylvania Application April 9, 1938, Serial No. 201,069

16 Claims. (Cl. 236—15)

The present invention comprises control apparatus and system improvements, especially devised and adapted for the attainment of various desirable objects.

One general object of the present invention is to provide an improved control system of the so-called "proportioning" type, characterized by the fact that its electrical bridge circuit is adapted to be balanced by an adjustment of one contact effected by means responsive to variations in one controlling condition, and to be unbalanced, also, by adjustment of a second contact effected by means responsive to a second controlling condition, and adapted to be rebalanced by the adjustment of a third contact effected by a relay element which is actuated by unbalance in the circuit to effect the rebalancing adjustment of the last mentioned contact and to effect a corrective control action.

Another general object of the present invention is to provide improved means for making the adjustment of a regulator, or, an analogous control action, dependent upon variations in each of two or more controlling conditions.

Another general object of the present invention is to provide an improved control system comprising separate regulators for separately regulating two control factors and means responsive to variations in one controlling condition for correspondingly adjusting each regulator and means responsive to a second controlling condition for relatively adjusting the two regulators.

Another object of the present invention is to provide an improved automatic control system for regulating furnace fuel and combustion air supply rates as required to maintain a predetermined furnace atmosphere or combustion gas composition.

Another object of the invention is to provide a system for controlling the composition of combustion gases in response to variations in their thermal conductivity, by which the ratio of combustion air to fuel supplied for combustion is increased when the thermal conductivity of the gases is below one predetermined value and when it is above a second predetermined value, higher than the first mentioned value, and by which said ratio is decreased when the thermal conductivity of the gases is intermediate said two values.

Another object of the present invention is to provide a combustion control system in which a gas analysis means of the thermal conductivity type, is combined in an especially advantageous manner with means responsive to a measure of the furnace temperature, or to some other furnace heat requirement measure.

Another object of the present invention is to provide a furnace control system in which fuel and preheated air combustions are supplied at rates regulated in automatic response to some furnace operating condition or conditions which combined with means for maintaining the temperature of the preheated air constant thereby facilitating the required regulation of the fuel and air supply rates.

For the attainment of some of the important objects and advantages of the present invention, it may be advantageous in some cases to make use of control instruments of the pneumatic, or air controller, type, but in a preferred practical form of the invention adapted for the attainment of all of the previously mentioned objects of invention, the control system comprises electrical instruments and apparatus connected to and associated with the above mentioned improved type of "proportioning" system bridge circuit.

While my improved control system has novel operating characteristics, and comprises novel apparatus element combinations, a practical advantage of the invention arises from the effective use which it permits, of control instruments and other apparatus elements previously devised and developed for other control purposes.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a diagrammatic representation of a metallurgical furnace and electrical control apparatus associated therewith;

Fig. 2 is a diagrammatic representation of the circuit connections of the control system of Fig. 1;

Fig. 3 is an end elevation of a portion of one of the control instruments shown in Fig. 1;

Fig. 4 is a perspective view of a contact adjusting portion of the instrument shown in Fig. 3;

Fig. 5 is a diagrammatic representation of a second control instrument shown in Fig. 1;

Fig. 5A is a diagrammatic view illustrating gas composition and thermal conductivity relations;

Fig. 6 is a diagrammatic representation of a modification of the apparatus shown in Fig. 1;

Fig. 7 is a somewhat diagrammatic representation of pneumatic control provision of a potentiometer instrument shown in Fig. 6;

Figs. 7A and 7B disclose modifications of the apparatus of Fig. 2, and

Fig. 8 is a somewhat diagrammatic representation of an air controller jointly controlled by the instruments separately responsive to gas composition and to furnace temperature, shown in Fig. 6.

In the embodiment of the invention illustrated diagrammatically by way of example in Fig. 1, A is a metallurical furnace of conventional type, having a heating chamber, to which gas, oil, steam, and combustion air may be supplied through gas, oil, steam, and air supply conduits, respectively, including control valves B, BA, BB and $b$. Each of said conduits except the air conduit is also provided with a bypass B' about the corresponding control valve, and with cutoff valves $B^2$ adjustable to cut off all flow through the conduit, or to permit of a flow regulated either by the adjustment of the control valve, or of the bypass associated with the conduit. With the arrangement shown in Fig. 1, the fuel may well be gas supplied through the conduit including the valve BB, when that fuel is available, and in such case flow through the steam and oil supply conduits is cut off. When the gas supply is inadequate, or the use of gas is undesirable for some other reason, flow through the gas supply conduit is cut off, and oil, and steam for atomizing the oil, are supplied through the oil and steam supply conduits. The gas, steam, and oil supply conduits may each include a pressure regulator $B^3$, at the inlet side of the corresponding control valve.

In the arrangement shown in Fig. 1, the supply of fuel, whether gas or oil, is automatically regulated as required to maintain an approximately constant furnace temperature. The regulating means provided for that purpose, comprise a thermocouple, thermometer bulb, or other suitable furnace temperature responsive device C, a measuring and control instrument DA' to which the device C is connected, and associated control apparatus $DA^2$, through which the instrument DA' controls the operation of a reversible motor EA. The latter, when energized for operation in one direction, gives opening adjustments to each of the values B, BA, BB, and when energized for operation in the other direction, gives simultaneous closing adjustments to said valves.

The supply of combustion air to the furnace A, is automatically regulated as required to maintain a furnace chamber atmosphere of approximately constant predetermined composition. The regulating means provided for this purpose comprises a conduit A', through which a furnace atmosphere sample, or stream of test gas, is continuously passed to gas analysis apparatus including a measuring and control instrument DB'. The latter acts through associated control apparatus $DB^2$ to control the operation of a reversible electric motor EB, giving opening and closing adjustments to the air value $b$, accordingly as it is operated in one direction or the other.

The control instruments and apparatus DA', $DA^2$, DB' and $DB^2$, are shown in Fig. 1, as mounted in a control instrument panel DC, which also supports other instruments and control apparatus, hereinafter referred to. A control system including the essential control elements of the instruments DA' and DB', and apparatus $DA^2$ and $DB^2$, and their electric circuit connections, is illustrated diagrammatically in Fig. 2. The control system shown in Fig. 2, comprises a section DA, including control elements of the instrument DA' and apparatus $DA^2$, and a second section DB, which includes the control elements of the instrument DB'. The two sections DA and DB are interconnected, or interlocked, in normal operation, as hereinafter described, to the ultimate end that an increase or decrease in the furnace fuel supply, produced by the operation of the motor EA, in response to a variation in the furnace temperature, may automatically effect an adjustment in the section DB tending to correspondingly increase or decrease the furnace air supply, and thus facilitate the maintenance of the desired furnace chamber atmosphere.

The control section DA shown in Fig. 2, comprises a control circuit including resistors $d$, $e$, $g$, and $g'$, all of which are, or may be, connected in parallel to a source of circuit energizing voltage, a separate contact engaging and movable along the length of each of the different resistors, means for adjusting the different contacts relative to the resistors, and means through which the motor EA is operated by and in accordance with voltage changes resulting from adjustment of said contacts. As shown in Fig. 2, the circuit energizing means comprises conductors 3 and 4 connected to the terminals of the secondary of a transformer F, the primary of which has its terminals connected to supply conductors 1 and 2. As shown, the conductor 3 is connected to the transformer secondary only when a cut out switch F' is closed.

The resistor $d$ is a furnace temperature measuring resistor, and is engaged by a contact D' which is moved longitudinally of the resistor $d$ up and down, as the furnace temperature to which the element C responds, respectively increases or decreases. As diagrammatically illustrated in Fig. 2, the device C is the bulb of a fluid pressure thermometer, and the bulb pressure is transmitted to a Bourdon tube element $D^2$, which flexes as the pressure changes, and thereby moves the contact D' along the resistor $d$. As hereinafter explained, in the instrument DA' shown in Fig. 1, other means are employed to adjust the contact D' along the resistor $d$. As shown, each terminal of the resistor $d$ is connected to the corresponding conductor 3, or 4, by a resistance $da$. The effect of the two resistances $da$ in series with the resistance $d$, is to increase the length of travel along the latter of the contact D' required to effect a given change in the potential of the latter.

The resistor $e$ is a control resistor and is engaged by a contact E' which is adjusted along the resistor $e$ by the operation of the motor EA through a mechanical connection $E^2$ between the contact and the armature of the motor EA, as the latter operates in one direction or the other. As shown, the resistor $e$ is connected to each of the conductors 3 and 4 through a corresponding resistance $ea$.

The resistors $g$ and $g'$ are reset resistors, engaged by corresponding sliding contacts G' and $G^2$, respectively. The contact G' is connected to the contact D by a resistor $g^2$, which is engaged by a corresponding sliding contact $G^3$. The contact $G^2$ is connected by a resistor $g^3$ to the contact E′, and resistor $g^3$ is engaged by a corresponding movable contact $G^4$. The contacts $G^3$ and $G^4$ may be adjusted, each toward the other, or each away from the other, by an operating connection $G^5$ between each of said contacts and a manually rotatable knob G.

The two contacts G′ and $G^2$ may be adjusted simultaneously, but in opposite directions along the resistors $g$ and $g'$, respectively, through a connection $G^6$ between each of said contacts and a rotatable gear element $G^7$. From the standpoint of the general control action obtainable, the reset element formed by the resistor $g$ and contact G′, is a mere duplicate of the reset element formed by the resistor $g'$ and contact $G^2$, and the general effect of a simultaneous adjustment of both contacts G′ and $G^2$, is obtainable by doubling the extent of adjustment given one of the contacts while holding the other stationary. The element $G^7$ is shown as connected to the armature shaft of a reset motor GA, which has two energizing windings $G^9$ and $G^{10}$, each having one terminal connected to a switch $F^2$, and thereby the conductor 3 when the switch is in its closed position. The other terminals of the windings $G^9$ and $G^{10}$ are connected through conductors 5 and 6 to elongated contacts $G^{11}$ and $G^{12}$, respectively. Those contacts are arranged end to end along the path of movement of an instrument contact $D^3$ which shares the movement of the contact D′, and is connected to the conductor 4. In consequence, when the controlling temperature to which the element C is responsive, is not at its normal value, so that the contact D′ is displaced in one direction or the other from its normal or predetermined intermediate position, the contact $D^3$ will be correspondingly displaced, and hence in engagement with one or the other of the contacts $G^{11}$ and $G^{12}$.

When the controlling temperature is above normal, so that the contact $D^3$ is in engagement with the contact $G^{12}$, the winding $G^{10}$ will be energized and the reset motor GA will turn in the direction to lower the contact $G^2$ and raise the contact G′, and when the contact $D^3$ engages the contact $G^{11}$, the winding $G^9$ will be energized, and the motor GA will operate in the reverse direction. The connection between the gear $G^7$ and shaft of motor GA includes a friction clutch $G^{13}$ adapted to yield and permit adjustment of the contact G′ and $G^2$ by manual adjustment of the gear $G^7$ effected through a knob $G^{14}$. The latter rotates idly when in normal operation, the motor GA is in rotation.

The motor EA is automatically operated by and as a result of a difference between the potentials of the two contacts $G^3$ and $G^4$, and the direction of motor operation is dependent on which of those two contacts has the higher potential. As shown, the operation of the motor EA is controlled through means responsive to the difference in the potentials of said contacts by means including a thermionic amplifier H, a reversible switch actuating motor I, directly controlled by the amplifier H and a switch J. The amplifier H has its input terminals H′ and $H^2$, connected to the contacts $G^4$ and $G^3$, respectively. The amplifier unit H has its output terminals $H^3$ and $H^4$ connected to the terminals of one winding I′ of the motor I. The latter has a second winding $I^2$, having one terminal connected by a conductor 7 to the conductor 3, and its other terminal connected by a conductor 8 to a center tap of the secondary winding of the transformer F.

The motor I is of such character as to be energized for operation in one direction when the potential of the contact $G^3$ exceeds the potential of the contact $G^4$ and to be operated in the opposite direction when the potential of the last mentioned contact exceeds that of contact $G^3$. This results from the fact that a reversal in the direction of the potential difference between the contacts $G^3$ and $G^4$ effects a 180° shift in the phase of the current flow through the motor winding I′. The motor I is biased to turn, when deenergized, into the position in which the switch J is held in its intermediate open position shown in Fig. 2. The switch J is a mercury switch, having a separate pair of contacts in each end of the container. With the switch in its intermediate position, the contacts of neither pair are connected by the mercury in the container.

The motor EA has two windings $E^3$ and $E^4$, each having one terminal connected to the supply conductor 1. The second terminal of the winding $E^3$ is connected to one of the contacts at the left hand end of the switch J and the second terminal of the winding $E^4$ is connected to one of the contacts at the right hand end of the switch J. In consequence, when the motor I operates to turn the switch counterclockwise out of its intermediate position, the winding $E^3$ is energized and the motor EA operates in one direction, and the motor EA is caused to operate in the other direction when the motor I turns the switch J clockwise away from its intermediate position.

As shown in Fig. 2, the resistor $d$ and associated resistances $da$, are connected to the energizing conductors 3 and 4 through switch blades L′ and $L^2$, respectively, only when said switch blades occupy their positions shown in full lines in Fig. 2. When the resistor $d$ and resistances $da$ are rendered inoperative by the adjustment of the switch blades L′ and $L^2$ into their positions shown in dotted lines in Fig. 2, the switch blades connect the conductors 3 and 4, through resistances $g^4$ and $g^5$, respectively, to the end of the resistor $g^2$ remote from the contact G′. The resistances $g^4$ and $g^5$ are alike, and with the switch blades L′ and $L^2$ in their dotted line positions, the potential of the contact D′, no matter what the furnace temperature may be, is the same as it is when the contact D′ is in its normal intermediate position and the switch blades L′ and $L^2$ are in their full line positions. The two switch blades L′ and $L^2$ are adapted for simultaneous operation back and forth between their closed and open positions, by a manual operating means including a pivoted switch lever L.

In the section DA of Fig. 2, a resistor $k$ is connected in shunt to the resistor $e$, between the corresponding terminals of the resistances $ea$. A contact K′ in engagement with and adjustable along the length of the resistor $k$, is connected by a conductor $K^2$ to one terminal of the resistor $k$, and is adjusted by, and in accordance with the direction of, rotation of a knob K, which is operatively connected to the contact K′ through a connection $K^3$. The immediate effect of the adjustment of the contact K′, is to vary the ratio of the movement of the conatct E′ to the change in potential of the contact E′ produced by the movement. The ultimate effect of the adjustment of the contact K′, is to vary the ratio of furnace temperature variation to resultant variation in the throttling effect or adjustment of the valves B, BA and BB. The adjustment of the contact K′, thus effects what is sometimes called a throttling range adjustment of the control system.

In normal operation, with the switch blades L' and L² in their full line position, an increase in the furnace temperature above its normal predetermined value, results in an adjustment of the contacts D' and D³ upward from their positions shown in Fig. 2. The up movement of the contact D' changes the potential of the contact G³, and the resultant difference between the potentials of the contacts G³ and G⁴, amplified in the amplifier H, energizes the motor I for operation in the direction required for that adjustment of the switch J which causes the motor EA to operate in the direction to give closing adjustments to the valve B, BA and BB. The operation of the motor EA in the direction described adjusts the contact E' in the up direction. The operation of the motor EA terminates when the potentials of the contacts G³ and G⁴ become equal, or so nearly equal that the motor I is deenergized, and the switch J is returned to its intermediate position.

The adjustment of the contact E', effected by the operation of the motor EA, is in the direction to equalize the potentials of the contacts G³ and G⁴ and thus terminate the operation of the motor. The adjustment of the contact E' is what is commonly known as a follow-up adjustment, and is continued until, partly or wholly as a result of that adjustment, the potentials of the contacts G³ and G⁴ are equalized to the extent required for the deenergization of the motor I, and the return of the switch J to its intermediate position in which the motor EA is deenergized. With no adjustments of the contacts G' and G², as may be the case when the switch F² is open, the operation of the motor EA will be interrupted solely as a result of adjustment of the contact E', and will occur when the adjustment of that contact is that required to make the potential of the contact E' the same, or approximately the same, as that of the contact D', assuming that the potentials of the contacts G' and G² are alike, as is contemplated.

In normal operation, with the switch F² closed, however, each valve closing operation of the motor EA will continue until the adjustment given the contact E' is somewhat greater than that required to make its potential the same as that of the contact D'. This results from the fact that so long as the contact D' is above its neutral position, the engagement of the contact D³ with the contact G¹² causes the motor GA to operate in the direction to raise the contact G', and lower the contact G². The described adjustment of each of the contacts G' and G², is in the direction to increase the difference between the potentials of the contacts G³ and G⁴ resulting from the original up adjustment of the contact D'.

The effect on the ultimate control action, resulting from the operation of the motor GA, is what is known as a compensating or reset action. In the operation of the furnace A, or of any ordinary furnace, the amount of fuel which must be supplied to maintain the desired normal temperature, is varied by variations in the furnace load, such as those due to a change in the amount of the material being heated, or in the temperature increase to be given that material. Stable operation with an automatic control system nominally effective to maintain a constant normal temperature and not including compensating or reset provisions, ordinarily requires the temperature maintained to be appreciably higher than the nominal normal value when the furnace load is appreciably below the average furnace load, and to be appreciably below the nominal normal temperature when the furnace load is appreciably above the average furnace load. With a control system including suitable compensating or reset provisions, it is possible to maintain substantially the same normal temperature with all furnace loads.

Proper control system performance, ordinarily requires that the reset adjustment action should be inherently and substantially slower than the follow-up action. If the two actions were effected at the same rate, the motors EA and GA would continue in operation, and the furnace fuel supply would be continuously diminished, until the furnace temperature returns to its normal value. With the reset or compensating action effected at a substantially slower rate than the follow-up action, the operation of the motor EA may, and ordinarily will, result in its temporary deenergization while the furnace temperature is still above normal. In such case, the slow operation of the motor GA will eventually unbalance the control circuit sufficiently to restart the motor EA into operation in the same direction as before, and in the same cases, the operation of the motor EA may thus be initiated and interrupted at more or less regular intervals, for an indefinite number of times.

A decrease in the furnace temperature below its normal value will result in control actions and effects, which are the converse of those described above as occurring when the temperature rises above its normal value.

Under certain unusual conditions, it may be desirable to manually effect slow or rapid reset adjustments of the contacts G' and G², and this may be accomplished by the manual rotation of the knob G¹⁴. In some cases, as in starting a furnace into operation, or in the case of a relatively wide change in operating conditions, it may be desirable to manually control the supply of fuel to the furnace, from time to time. This result may be effected with the apparatus shown in Fig. 2, by shifting the switch blades L' and L² into their dotted line positions, and turning the knob G¹⁴ as required to effect the desired direction and extent of operation of the motor EA.

The control system section DB is identical in most respects with the section DA, and similar parts in the two sections are designated by the same reference symbols, except that, for convenience, the reset motor designated GA in section DA, is designated GB in section DB, and the control motor designated EA in section DA, is designated EB in section DB, and the contact corresponding to the contact D' of section DA, is designated D⁴ in section DB.

The apparatus of section DB for determining the positions of the contact D⁴, and for energizing the motor GB, differs from the previously described apparatus for adjusting the contact D' and energizing the motor GA. The position of contact D⁴ of the section DB, along its associated resistor d, depends upon, and is varied in proportion to variations in the position of the contact E₂ of the section DA along its associated resistor e. As shown, this results from the fact that the contact D⁴ is adjusted by the control motor EA through an extension E⁴⁰ of the operating connection through which said control motor adjusts the contact E' and the valves B, BA, and BB.

The section DB apparatus, omits the previously mentioned contacts G¹¹ and G¹² and makes the operation of the motor GB dependent on the adjustment of mercury switches M, N and O. The switch O may also be adjusted to energize the motor EB for operation in one direction under conditions in which the associated switch J does not energize the motor EB. The switches M, N and O are adjusted in accordance with the composition of the gas in the test stream withdrawn from the furnace through the conduit A'.

In the operation of the section DB apparatus, the adjustment of the contact $D^4$ has no direct effect on, or relation to, the operative condition of the motor GB, and the latter does not serve any such compensating purpose as is served by the motor GA. On the contrary, the operation of the motor GB results from, and tends to neutralize variations in the composition of the furnace atmosphere gas sample drawn out of the furnace through the conduit A'. When operation of the motor GB unbalances the control circuit of section DB, by its adjustment of the corresponding contacts $G'$ and $G^2$, the motor EB starts into operation in the direction to effect a corrective adjustment in the air supply.

As previously indicated, the invention is desirably characterized by the fact that it may be carried out by apparatus which, for the most part, is in existence and has been devised and developed for other purposes. Thus the DA section, control circuit of Fig. 2, is a control circuit disclosed and claimed in the previous application of Harry S. Jones, Serial No. 157,084, filed August 3, 1937, now Patent No. 2,246,686, granted June 24, 1941.

As shown, the control instrument DA' is of the well known, commercial "Brown potentiometer" type, including a pen carriage $D^{20}$ which is deflected in accordance with variations in the quantity measured, by means of a screw shaft $D^{21}$. The latter is rotated in one direction or the other by the rebalancing mechanism of the instrument, in response to deflections of the pointer $D^{22}$ of a galvanometer (see Fig. 5) which responds to unbalance in the potentiometer measuring system. When such a potentiometric instrument is used, the furnace temperature responsive bulb C of Fig. 2 is ordinarily replaced by a thermocouple, and the instrument galvanometer responds to unbalance between the thermocouple voltage and the voltage drop in a variable portion of the potentiometer slide wire resistance, which portion is connected in series with the thermocouple and galvanometer. Further description or illustration of the measuring and rebalancing features of the instrument DA' is unnecessary, as they form no part of the present invention, and in respect to those features, the instrument DA' is of well known commercial type, and generally like, or equivalent in principle to, the control potentiometer instrument shown in Harrison Patent No. 1,946,280, granted February 6, 1934.

In the "Brown potentiometer" control instrument, the movements of the pen carriage $D^{20}$, gives movements to a pen $D^{23}$ tracing a record of the value of the quantity measured, on a chart $D^{24}$, and the pen carriage cooperates, for control purposes, with a control table $D^{30}$. The latter is located at a point along the path of travel of the pen carriage $D^{20}$ which may be adjusted, and which fixes the normal or desired value of the control quantity measured by the instrument. A part $D^{31}$ carried by the control table $D^{30}$, cooperates, in the particular form of "Brown potentiometer" shown in Figs. 3 and 4, with a part $D^{200}$ of the pen carriage $D^{20}$, to adjust a pivoted part $D^{32}$ angularly about its pivotal axis $D^{33}$, into different positions corresponding to different extents of departure of the controlled quantity from the desired or normal value thereof. As shown in Figs. 3 and 4, the member $D^{32}$ is connected by a link $D^{34}$ to the arm $D^{35}$ of rock shaft $D^{36}$, thereby giving angular adjustments corresponding to those given the part $D^{32}$ by the rock shaft. The rock shaft $D^{36}$ supports and moves arms which constitute, or carry, the contacts $D'$ and $D^3$ respectively engaging the resistor $d$, and control contacts $G^{11}$ and $G^{12}$ of Fig. 2.

As will be apparent to those skilled in the art, the instrument DA' is not necessarily a "Brown potentiometer" but may be a control instrument of any other known or suitable form, adapted to measure a control quantity, and, directly or through a suitable relay mechanism, give corresponding adjustments to the contacts $D'$ and $D^3$.

The instrument DA' does not need to include any parts of the apparatus shown in Fig. 2, other than the contact $D'$ and associated resistor $d$, and the contacts $D^3$, $G^{11}$ and $G^{12}$, and means for adjusting the contacts $D'$ and $D^3$ in accordance with the variations in the controlling temperature. While the control instrument DA' necessarily includes no part of the apparatus shown in Fig. 2, other than those just mentioned, it may include other parts, and in particular, it may include the amplifier H, motor I, and the switch J. The motor EA of Fig. 2, is necessarily located adjacent the valves or dampers which it adjusts, and ordinarily is located at a distance from the control instruments and associated control apparatus mounted on the panel DC shown in Fig. 1. The resistor $e$ and contact $E'$ of control section DA, and the resistor $d$ and contact $D^4$ of section DB, and the motor EA are ordinarily combined in a single mechanical unit. Ordinarily, the reset motor GA and the contacts and resistors which it relatively adjusts, forms a mechanical unit not included in the instrument DA', but included in the apparatus $DA^2$ mounted on the panel DC shown in Fig. 1.

The gas analysis apparatus receiving the sample or test gas flowing through the pipe A', may be of any known or suitable form. In particular it may well be of the thermal conductivity type disclosed in the Harrison Patents No. 1,818,619, granted August 11, 1931, and No. 1,829,649, granted October 27, 1931, in which resistors in test and standard gas cells are connected into a Wheatstone bridge circuit, so as to create a measurable potential difference which is a function of the thermal conductivity and thereby of the composition of the gas passed into the test cells through the pipe A'.

The apparatus shown in Fig. 2 may be adjusted to maintain a furnace atmosphere of any desired composition through a wide range of composition variation. In Fig. 5A each point on the curve sections $Y'$ and $Y^2$ represents a gas thermal conductivity value proportional to the distance of the point from the line of the horizontal scale which comprises the sections $X'$ and $X^2$. The thermal conductivity values collectively indicated by each of the curve sections $Y'$ or $Y^2$ are those which the measuring apparatus is calibrated to exhibit as the pen carriage moves along the corresponding scale section $X'$ or $X^2$, respectively, in linear proportion with the changes in the thermal conductivity of the gas measured which result in the pen carriage movements. The linear proportion between the extent of change in the thermal conductivity of the gas measured and the resultant movement of the pen carriage depends upon the calibration of the measuring apparatus. Usually, and as contemplated in Fig. 5A, the measuring apparatus is adjusted as hereinafter described to make the said proportion or ratio of thermal conductivity change to pen carriage movement smaller when measuring thermal conductivities in the range of the thermal conductivity of furnace products of complete combustion including varying amounts of $CO_2$, than when measuring thermal conductivities in the higher range of the thermal conductivities of gaseous mixtures including air and significant amounts of unconsumed combustible. That difference in proportion or ratio explains why the curve section $Y^2$ is more steeply inclined to the horizontal than is the curve section $Y'$.

With complete combustion, the thermal conductivity of ordinary furnace products of combustion varies in definite and known relation to the percentage of $CO_2$ of said products, and in Fig. 5A the scale $X'$ is graduated in $CO_2$ content percentages varying from 15% to zero. In consequence, under any normal operating condition in which complete combustion of the usual fuel gas is effected, the position of the pen carriage along the scale section $X'$ will correctly indicate the $CO_2$ content of the furnace gases. Similarly, under a different normal operating condition of such character as to maintain a significant amount of unburned combustible in the products of combustion, the position of the pen carriage along the scale section $X^2$ will vary in proportion to the change in the amount of unburned combustible in the furnace gases. In general, however, when the pen carriage is along the scale $X^2$, the thermal conductivity of the furnace gases will depend upon the amount, if any, of $CO_2$ in the gases, and on the ordinarily unknown relative amounts of CO and $H_2$ in the furnace gases. In consequence, and in accordance with the usual practice of the art, the scale $X^2$ is not graduated to indicate the absolute amount of unburned combustible in the furnace gases, but has a graduation or scale unit of one-hundredth part of the amount of unburned combustible in admixture with air which will give the maximum thermal conductivity value which the apparatus is calibrated to measure.

With the apparatus arranged as contemplated in Fig. 5 to normally maintain a definite $CO_2$ content in the furnace gas appreciably below 15%, combustion will be complete and the position of the pen carriage will accurately indicate the $CO_2$ content of the furnace gases, and said $CO_2$ content will normally vary but little. With the apparatus so arranged, if through some mischance as, for example, a partial or complete breakdown of the combustion air supply fan, the ratio of combustion air to fuel gas should diminish when it would be increased if the apparatus were in normal condition, the thermal conductivity of the furnace gases would first diminish as the $CO_2$ content increases to its maximum of about 15%, and would then increase as a result of incomplete combustion and the resultant inclusion of unburned combustible in the furnace gases. Under this abnormal condition, as the thermal conductivity rises the pen carriage will move from the left-hand end of the scale section $X'$ into a position alongside the scale $X^2$. As the pen carriage thus moves to the right from the left-hand end of the scale section $X'$, the apparatus will correctly measure the thermal conductivity of the gases, but the thermal conductivity measurements then made ordinarily can afford no precise indication of the composition of the furnace gases owing to the wide variation then possible in the relative amounts of $CO_2$ and unburned combustible in the gases. With the apparatus adjusted to maintain a furnace atmosphere composition including no unburned combustible, some excess air, and a relatively high amount of $CO_2$, an increase in the $CO_2$ above its normal value results in a decrease in the thermal conductivity in the composition which can be corrected for by increasing the ratio of air to fuel supplied to the furnace. For the attainment of that result, the instrument DB' is adapted to close the switch N, when the thermal conductivity diminishes below its normal value to the value indicated by the point $mn$ in the curved section $Y'$ of Fig. 5A. The closure of the switch N connects the terminal conductor 5 of the winding $G^9$ of motor GB to a branch 9 from the DB section conductor 4. The resultant operation of the motor GB effects operation of the motor EB in the direction to give an opening adjustment to the valve $b$.

On an initial increase in the thermal conductivity of the gas, the required corrective step is a decrease in the ratio of air to fuel supplied to the furnace, and to effect this result, the instrument DB' is adapted to adjust the switch M to its closed position when the thermal conductivity of the gas increases from a lower value to the value indicated by the point $mn$ of Fig. 5A. With the switch O tilted counterclockwise from the position shown in full lines in Fig. 2, so that its left hand terminals are electrically connected, the closure of the switch M connects the terminal conductor 6 of the winding $G^{10}$ of motor GB to the branch conductor 9 through the left hand contacts of switch O. The resultant energization of the motor GB causes the motor EB to give a closing adjustment to the valve $b$.

With the operating conditions described, the effect of an initial increase in thermal conductivity above its desired normal value, may be corrected by a decrease in the ratio of air and fuel supplied. If the amount of air supplied to the furnace is so diminished as to result in incomplete combustion and the presence of CO or $H_2$, or both in the furnace atmosphere, a further reduction in the relative amount of air supplied to the furnace will not tend to decrease but to increase the thermal conductivity of the furnace gases. To take care of this, the instrument DB' may be arranged so that on an increase in thermal conductivity of the furnace gas, indicating that the latter contains unburned combustible, the instrument will tilt the switch O into a position sufficiently displaced clockwise from the position shown in Fig. 2 to electrically connect the right hand switch contacts and the conductors 10 and 11 connected thereto. The conductors 10 and 11 then complete an energizing circuit connection for the winding $E^3$ between the supply conductors 1 and 2, regardless of the position of the switch J, and the motor EB starts into operation in the direction to give an opening adjustment to the valve $b$. The adjustment of the switch O into position to connect the conductors 10 and 11, necessarily insures that the switch M is then disconnected from the conductor 9. The condition giving rise to the above mentioned clockwise adjustment of the switch O, is an abnormal condition, and the operation of the motor EB resulting from said adjustment of the switch O, is a safety control action.

In some cases, however, it is desirable to maintain a mildly reducing furnace atmosphere composition, including unburned combustible and having a relatively high thermal conductivity. For operation under that condition, the switch O is not required and the switches M and N should be operatively interchanged so that on increases or decreases in the thermal conductivity, respectively, above and below the normal desired value of the thermal conductivity, the motor GB will cause the motor EB to respectively increase or decrease the supply of air to the furnace.

The instrument DB' for adjusting the switches M, N and O as above described, may be a "Brown potentiometer" instrument having control switch actuating provisions of the character illustrated in the above mentioned Patent 1,946,280. In the form shown diagrammically in Fig. 5, the relay mechanism $D^{40}$ controlled by the deflection of the pointer $D^{22}$ of the galvanometer, in response to the potentiometer unbalance resulting from a change in the thermal conductivity measurement of the test gas passing through the gas analysing means $D^{41}$, is arranged to rotate the shaft $D^{21}$, in the direction to move the pen carriage $D^{20}$ to the right or left, on an increase or decrease, respectively in the thermal conductivity of the test gas. The switch actuator $D^{42}$ is engaged by the pen carriage and thereby shifted into its full line position, as the pen carriage moves to the right through its position corresponding with the thermal conductivity of the test gas, which the instrument adjustment tends to maintain. The switch actuator $D^{42}$ is moved into its dotted line position by the pen carriage, as the latter moves to the left through its said position.

The switch actuator $D^{42}$ is shown as connected by a link $D^{43}$ to a pivotally mounted switch supporting disk $D^{49}$ which carries the switches M and N. The parts are so relatively arranged that movement of the actuator $D^{42}$ into its full line position, adjusts the switch N into its open position and adjusts the switch M into its closed position, while adjustment of $D^{42}$ into its dotted line position closes the switch N and opens the switch M.

A second switch actuator $D^{45}$ is arranged along the path of movement of the pen carriage $D^{20}$ in position to be engaged by the latter and shifted between its full and dotted line positions by the pen carriage, as the latter moves through a position corresponding to a thermal conductivity of the test gas which is indicated by the point o in Fig. 5A, and which is intermediate the range of conductivity corresponding to a varying amount of $CO_2$ in a composition including no unburned combustible, and the higher thermal conductivity range corresponding to that of the test gas containing a significant amount of unburned combustible. The switch actuator is connected by a link $D^{46}$ to a pivoted disk $D^{47}$ carrying the switch O. The parts are so arranged that with the pen carriage position corresponding to some value in the lower thermal conductivity range, the switch actuator $D^{45}$ will be in its full line position and the switch O will be tilted into the position in which its right hand contacts as seen in Fig. 5, are connected by the mercury of the switch container, so that the closure of the switch M will result in a corresponding energization of the motor GB. When the thermal conductivity is within the higher range and the actuator $D^{45}$ occupies its dotted line position, the position of the disk $D^{47}$ will be such that the right hand contacts of the switch O will be disconnected and the left hand contacts will be connected by the mercury in the container.

The switch carrier $D^{47}$ supports a second switch P, which has a right hand contact $P^1$ connected to a central contact $P^2$ only when the position of the switch corresponds to the full line position of the actuator $D^{45}$, and has a left hand end contact $P^3$ connected to the contact $P^2$ only when the actuator $D^{45}$ is in its dotted line position. The contacts $P^1$, $P^2$ and $P^3$ are connected to circuit conductor of the analyzer $D^{41}$, so that the adjustment of the switch P automatically adjusts the scale of the thermal conductivity measurement as the thermal conductivity of the gas passes through the valve at which the switch actuator $D^{45}$ is shifted between its full and dotted line positions. The use of the switch P thus permits the scale of measurement to be more open when the thermal conductivity is in the range corresponding to the presence of unburned combustible in the gases than in the lower thermal conductivity range, in which the gases contain no unburned combustible. Further reference to the switch P and the associated means through which its purposes are accomplished is unnecessary herein, however, as said switch and means form no part of the present invention, but are disclosed and claimed in my prior application Serial No. 144,238, filed May 22, 1937, now Patent No. 2,241,555, granted May 13, 1941. It is noted, however, that in instruments including provisions for changing the measuring scale in the manner described, it is customary to use one half of the scale for the lower conductivity range, with the scale markings in conjunction therewith, graduated in $CO_2$ percentages from zero to 15%, and to associate with the right hand range, scale markings graduated in arbitrary divisions from 1 to 100 or in hydrogen percentages from zero to 100%.

For the purposes of the present invention, the switch actuator $D^{42}$ may well be adjustable through nearly the full range of deflection of the galvanometer pointer.

When, as is usual, the air for combustion supplied to the furnace through the conduit including the valve b, is preheated, the maintenance of a constant degree of preheat is desirable. The preheat may be kept approximately constant with the apparatus shown in Fig. 1, by means of a control instrument Q responsive to the temperature of a thermocouple q inserted in the air conduit and controlling the operation of a reversible motor Q'. The instrument Q may well be a "Brown potentiometer" having motor controlling switches adjusted as disclosed in Patent 1,946,280. The motor Q' operates on increases and decreases in the temperature of the thermocouple Q, to give opening and closing adjustments to damper means $Q^2$ regulating the flow into the air conduit, of unheated atmospheric air through a tempering air inlet branch $Q^3$ of the air conduit.

As shown, the panel DC supports a control instrument R responsive to variations in the pressure of the furnace chamber transmitted through the pipe R' and operating through control apparatus $R^2$ and $R^3$ to adjust the furnace stack damper RA as required to maintain the desired furnace chamber pressure. The apparatus shown for controlling the damper RA forms no part of the present invention, but may be of the character disclosed in my prior patent application, Serial No. 129,857, filed March 9, 1937, now Patent No. 2,252,323, granted August 12, 1941. Panel DC also supports flow meters S and SA provided for measuring the flow of oil and gas, respectively, to the furnace.

The general operative results of the control system illustrated in Figs. 1 to 5 will be apparent to those skilled in the art it is believed from what has already been said. The fact that on a change in the furnace heat requirement, the instrument DA' gives corresponding adjustments to the fuel and air valves, does not insure the maintenance of a contant furnace atmosphere, but contributes thereto and reduces regulation the extent required which instrument DB' must effect to maintain the proper atmosphere composition and thus tends to make that regulation more efficient. As will be apparent, the maintenance of a constant air preheat temperature adds to the efficiency of the air volume regulation effected by the instruments DA' and DB', and makes it possible to obtain results with the simple type of motor actuated damper regulator better than could otherwise be obtained without the use of a more complicated regulator.

A "proportioning" system circuit which, like that of the control section DB of Fig. 2, is subjected to an unbalancing effect by the adjustment of one contact such as $D^4$, in response to variations in one controlling condition, and to a second unbalancing effect by the adjustment of a second contact, such as $G^1$ or $G^2$ in response to variations in a second controlling condition, and is rebalanced by the adjustment given a third contact, such as $E^1$, by the "proportioning" relay, when the latter is actuated by circuit unbalance to produce a control effect, constitutes a novel arrangement for effecting what is known as interlocked control, useful for many purposes in addition to the combustion control purposes served by the apparatus of Fig. 2.

The provisions including the switch O, through which the control instrument DB' increases the air to fuel ratio, on an abnormal increase in the thermal conductivity of the combustion gases to a value indicating the presence therein of a significant amount of unburned combustible, though normally operating to increase and decrease that ratio as the thermal conductivity of the gases falls below and rises above a predetermined value lower than the value first mentioned, which is obtainable with complete combustion and with a considerable $CO_2$ content in the combustion gases, provides a desirable safety control action, obtainable in a very simple and effective manner. The means providing that safety action, are adapted for use in control systems employed for other purposes, in which a similar or analogous safety control action is desirable.

I am aware that in systems for controlling combustion in boiler furnaces, various proposals for the control of combustion conditions in response both to a furnace heat requirement and to the composition of the combustion gases, have been made, but in those proposals, the control responsive to the composition of the combustion gases, was, provided for the primary purpose of insuring combustion efficiency. For that purpose, no such close control of the air to fuel ratio is required, as is essential in the operation of a metallurgical furnace, the efficiency of combustion in which, is relatively unimportant in comparison with the avoidance of injury to the metal heated which may result from the exposure of the latter to an atmosphere slightly more oxydizing or slightly more carbonizing than the proper atmosphere.

For the general combustion control purposes for which the apparatus shown in Figs. 1 and 2 is adapted, I may make use of control apparatus of other forms. In particular, as illustrated in Figs. 6, 7 and 8, the various fuel and air dampers may be adjusted by fluid pressure regulating devices, instead of reversible electric motors; and in such case, the control instruments employed are adapted to supply air to the regulating devices at pressures selectively dependent upon the corresponding controlling conditions.

In the arrangement shown in Fig. 6, the supply of fuel to the furnace A is regulated by a valve $B^{10}$ adjusted by a pneumatic valve actuator S, into different positions in selective accordance with the air pressure transmitted to the actuator through the pipe S' from an air controller element of a control instrument $DA^5$. In Fig. 6, an air controller $DB^6$ jointly controlled by the instrument $DA^5$, and by an instrument $DB^5$ which is responsive to the thermal conductivity of the combustion gases, supplies air at a suitable controlling pressure to the actuator SA of the valve $B^{11}$ regulating the supply of air to the furnace, and, the air controller element of a regulator QA, responsive to the temperature of the air supplied to the furnace, supplies controlling air at the proper pressure to an actuator SB adjusting a valve $B^{12}$ regulating the amount of cold, tempering air supplied through the branch $Q^3$ to the conduit through which preheated air is supplied to the furnace. Each of the air controllers receives air under pressure through a pipe $S^0$. Each of the valve actuators S, SA and SB, may advantageously be of the type known as a valve or piston positioner, now in commercial use and disclosed and claimed in the patent application of Coleman B. Moore, Serial No. 137,247, filed April 16, 1937, now Patent No. 2,237,038, granted April 1, 1941.

As shown in Figs. 6 and 7, the control instrument $DA^5$ is a "Brown potentiometer" instrument of particular commercial form like that shown in Figs. 3 and 4, in that control effects are produced as a result of the mechanical interaction of the pen carriage part $D^{200}$ and control table part $D^{31}$. In the arrangement shown in Figs. 6 and 7, the angular adjustment of the part $D^{31}$ about its pivotal axis $D^{33}$, operatively adjusts the flapper valve of an air controller element included in the instrument $DA^5$, through connections of the character disclosed and claimed in the patent of Coleman B. Moore, No. 2,093,119, granted September 14, 1937. Those connections comprise a part $D^{50}$ connected to the part $D^{31}$ to share the oscillatory movements of the latter, a link $D^{51}$ connecting the part $D^{50}$ to one arm of a rocking element $D^{52}$, and a link $D^{53}$ connecting a second arm of the element $D^{52}$ to the flapper valve actuating element T of the air controller.

The air controller shown in Fig. 7, is of a form fully disclosed in the Coleman B. Moore patent, No. 2,125,081, granted July 26, 1938, and now in extensive commercial use. The actuating member T is a lever pivoted at T' to an adjustable fulcrum member $T^2$, in the form of a lever having a stationary fulcrum pivot $T^3$. The movements of the lever T move a flapper valve $T^4$ away from, or permit it to approach a nozzle or bleed orifice member $T^5$. The flapper valve $T^4$ is mounted on a stationary pivot $T^6$, and is biased for movement in the direction in which it approaches and restricts the discharge through the nozzle $T^5$. The lever T acts on the flapper $T^4$ through a pin $T^7$ carried by a depending arm of the lever.

The nozzle $T^5$ receives air from a pipe $T^8$, supplying air at a suitable and approximately constant pressure, through a restricted passage formed by a small bore pipe U', included in a pilot valve mechanism U, so that the pressure in the nozzle $T^5$, which constitutes the primary control pressure of the control apparatus, increases and decreases as the flapper valve $T^4$ moves toward and away from the nozzle. The primary control pressure is transmitted by a pipe $T^9$ to a chamber $U^2$ of the pilot valve mechanism. One wall $U^3$ of that chamber is movable, and separates the chamber $U^2$ from a second pilot valve chamber $U^4$. The pressure in the latter is regulated by a valve $U^5$ actuated by the said movable wall $U^3$. The pressure in the chamber $U^4$ is thus maintained in constant proportion to the primary control pressure in the chamber $U^2$, and constitutes the ultimate control pressure of the apparatus.

Said ultimate control pressure is transmitted by a pipe S' to the valve actuator S. The ultimate control pressure is also transmitted by a branch pipe $S^2$ to mechanism V, forming a part of the control apparatus, and adapted, following and as a result of each initial change in the ultimate control pressure, effected through link $D^{53}$, to give the lever T an initial follow-up adjustment, and a delayed compensating adjustment. The follow-up adjustment neutralizes a portion of the initial adjustment of the flapper valve $T^4$ effected by the link $D^{53}$. The delayed compensating adjustment slowly neutralizes more or less of the effect of the preceding follow-up adjustment.

The mechanism V comprises bellows elements, two of which are connected by a connecting rod V', which carries a projection $V^2$. The latter acts on lever $T^2$ through a lever $V^3$ pivoted at $V^4$, and a pin $V^5$ interposed between the levers $V^3$ and $T^2$. The pin $V^5$ is supported by a member $V^6$ adjustable to vary the leverage with which the lever $V^3$ acts on the lever $T^2$. The latter is biased for movement in the clockwise direction, as seen in Fig. 7. Details of the construction and operation of the mechanism V, not specifically referred to herein, will be understood by those skilled in the art from the drawings, and need not be described herein, particularly as that mechanism is not only fully disclosed in said prior Patent No. 2,125,081, but is in extensive use.

The instrument $DB^5$ may be a "Brown potentiometer," which, in respect to its association with apparatus for analyzing furnace gases, may be exactly like the instrument DB', and the switches M, N and O adjusted by the instrument $DB^5$, are employed to control a reversible motor $GB^{10}$, which may be identical with the previously described reset motor GB. The motor $GB^{10}$ is employed, as shown in Fig. 8, to adjust a mechanical resetting, or control point adjusting, mechanism of the air controller $DB^6$.

The air controller $DB^6$ shown in Figs. 6 and 8, is similar in many respects to the air controller shown in Fig. 7 and comprises parts T—$T^7$, and V—$V^5$, similar to the correspondingly designated parts of Fig. 7. The nozzle $T^5$ of Fig. 8 is intended to receive air from a supply pipe, or be associated with a pilot valve mechanism like the pipe $T^8$ and pilot valve mechanism U of Fig. 7.

The air controller $DB^6$ shown in Figs. 6 and 8 is of a type and form, also disclosed in the said prior Patent No. 2,125,081, which lacks the compensating provisions of the air controller shown in Fig. 7, but includes a follow-up adjustment mechanism. The follow-up mechanism VA of Fig. 8, comprises a bellows $V^{10}$ subjected externally to the controlling air pressure transmitted to the mechanism VA from the pilot valve by the pipe $S^2$. The tendency of the bellows $V^{10}$, resulting from its own resiliency, to maintain a constant length, is supplemented by the action of springs $V^{12}$ and $V^{13}$. The plunger V' secured at one end to the movable end wall of the bellows $V^{10}$, carries a projection $V^2$ and as the bellows $V^{10}$ elongates and contracts, it effects corresponding adjustments of the lever $T^2$ through a thrust transmitting connection between the lever $T^2$ and the plunger projection $V^2$. The thrust connection comprises a wedge shaped thrust block $V^{15}$ pivotally suspended from an adjustable support $V^{16}$, and lever $V^3$.

The flapper actuating lever T of Fig. 8 is angularly adjusted by a link W suspended from the mid-point of a floating lever W'. That lever is pivoted at one end to a lever X pivotally supported at X' and having its other end connected by a link $X^2$ to the movable end wall of a bellows chamber $X^3$ into which the controlling pressure of the instrument $DA^5$ is transmitted through the pipe $S^3$. The second end of the lever W' is pivotally connected to one arm of a bell crank lever Y pivotally supported at Y' and angularly adjusted by a link $Y^2$, connecting the second arm of the bell crank lever to an adjustable crank arm $GB^{11}$ carried by a disc $GB^{12}$ rotated by the motor $GB^{10}$.

In respect to the provisions shown in Fig. 8 for supporting and adjusting two ends of the floating lever W', Fig. 8 diagrammatically illustrates the arrangement disclosed and claimed in the above mentioned Moore Patent No. 2,125,081. In the preferred practical form of that arrangement illustrated in the last mentioned patent, the two rocking element supports for the floating lever, unlike those marked Y and X in Fig. 8, turn about a common axis, approximately midway between the ends of the floating lever.

The general operation of the apparatus shown in Figs. 6, 7 and 8, is substantially the same as that of the apparatus shown in Figs. 1–5. The temperature responsive instrument $DA^5$, by transmitting the same controlling air pressures to the fluid pressure motors S and SA, effects similar and simultaneous adjustments of the fuel and air supply valves $B^{10}$ and $B^{11}$, respectively. The instrument $DB^5$ may be arranged to respond exactly as does the instrument DB', to a given change in combustion gas thermal conductivity and composition. The response of the instrument $DB^5$ produces its effect on the adjustment of the air valve $B^{11}$, by its control of the motor $GB^{10}$, in a manner analogous to that in which the instrument DB' produces its effect by its control of the reset motor GB. The ultimate effect of the operation of the controlled motor on the air supply valve may be made exactly the same in one arrangement as in the other for the same change in gas composition. So far as its general effect on the ultimate control action is concerned, the follow up adjustment resulting from the expansion and contraction of the bellows $V^{10}$ of Fig. 8, is the equivalent of that obtained by the adjustment of the contact E' of Fig. 2. As those skilled in the art will understand, however, the electrical control system of Fig. 2, and the electro-pneumatic control system of Fig. 6, are not full equivalents, and each has advantages over the other for use under certain conditions.

Alternatively to the arrangement of Fig. 8, I may substitute for the switches M, N and O and motor $GB^{10}$, a pneumtaic device such as the device VA of Fig. 8, the flapper $T^4$ of which would be operated by carriage $D^{20}$ of atmosphere analyzer DB'. The pressure created by the pneumatic device would then position the bell crank Y.

In referring herein and in the appended claims, to the adjustment of the contacts $G'$, $G^2$, $G^3$, etc., the adjustment of these contacts relative to their respective resistors $g$, $g'$, $g^2$, etc., is contemplated, and such adjustment may be effected by moving the resistors while the contacts engaging them are stationary, as is done in some commercial potentiometer instruments, as well as by moving the contacts while holding the resistors stationary, as is done in other commercial potentiometer instruments.

Without suitable preventive provisions, such a control system as is shown in Fig. 2 may sometimes become objectionably unbalanced as a result of the operation of either reset motor GA or GB, after the corresponding control motor EA or EB, respectively, has adjusted the corresponding control valve or valves into their end positions. As a result of such continued operation of either reset motor, on a restoration of the control system to the condition at which a corresponding control valve or device should be adjusted back from its end position, the system may be so far out of balance, that the condition will overswing to the opposite side of its normal value to remove the reset correction, before the system can stabilize.

The described over-operation of each reset motor may be prevented by means operating automatically, on the adjustment of the corresponding control valve or valves into end position, to prevent further operation of the reset motor as a result of a further change in the controlling condition in the direction resulting in said end position adjustment. For example, the limit switch mechanism, not shown in Fig. 2, but customarily employed with each of the control motors EA and EB, may be associated with the energizing circuits for the corresponding reset motor GA or GB, so as to prevent the objectionable operation of the latter. For example, as shown in Fig. 7A, the limit switch mechanism $E^{80}$ of the motor EA, which operates limit switches $E^{81}$ and $E^{82}$ in the connections between the switch J and the motor windings $E^3$ and $E^4$, respectively, serves also to open and close a switch $E^{83}$ when the limit switch $E^{81}$ is opened and closed, and to open and close a switch $E^{84}$ when the limit switch $E^{82}$ is opened and closed. The closing and opening of the switch $E^{83}$ respectively connects and disconnects the contact $G^{12}$ to the conductor 5, and thereby to the winding $G^9$ of the reset motor GA. Similarly, the closing and opening of the switch $E^{84}$ connects and disconnects the contact $G^{11}$ to the conductor 6, and thereby to the winding $G^{10}$ of the motor GA.

The same general end attained by the modification of Fig. 7A may also be attained with the modification of Fig. 7B in which a pair of switches JL are inserted, one in each energizing conductor to the motor GA, and adapted to be tilted together with switch J. Switches JL are adapted to be both closed in the mid position of switch J, but one only of which is closed when switch J is tilted.

For example, the switch JL which is inserted in circuit with the energizing field of motor GA tending to produce, through adjustment of the control network, adjustment of the fuel valve in the closing direction, is opened on a movement of the switch J which will directly produce closure of the control valve. Consequently the reset or compensating action of motor GA is not permitted to function when the fuel valve has reached its limit in the closed direction, and the control network is unbalanced tending to produce further closure, as will be the case in the event of abnormal changes. The reset action will therefore not take place after the fuel valve has reached its limit, thereby preventing accumulation of that effect.

Obviously also, if it is desirable or at least permissible to insert a relay between switch J and motor EA to be energized by switch J and in turn energize motor EA, the same relay may be adapted to interrupt the appropriate conductor to motor GA. In instances in which a small total amount of reset action is permissible, the end of avoiding objectionably large cumulative reset action may be prevented by suitably adjusting the limit stops $G^{10}$ for gear $G^7$, as shown in Figure 2.

While in accordance with the provisions of the statutes, I have illustrated and described the best forms of my invention now known to me, it will be apparent to those skilled in the art, that changes may be made in the form of the apparatus and modes of operation specifically illustrated and described herein, without departing from the spirit of my invention as set forth in the appended claims, and will also understand that certain features of my invention may sometimes be used to advantage without a corresponding use of other features.

Having now described my invention, what I claim as new and desire to secure by Letters Patent is:

1. In the operation of a metallurgical furnace to heat a furnace charge to a predetermined temperature while enveloping said charge in an atmosphere comprising products of combustion of fuel burned to heat said furnace and charge and of a composition predetermined in accordance with the temperature and nature of said charge, the method of regulating furnace combustion conditions which consists in varying the rates at which fuel and combustion air are supplied to the furnace by and in accordance with furnace temperature variations, and modifying the ratio of said rates by and in accordance with variations in the composition of the combustion gases.

2. In the operation of a metallurgical furnace, the method of regulating furnace combustion conditions which consists in subjecting the combustion air to a temperature regulating effect tending to maintain an approximately constant degree of preheat, and varying the rates at which fuel and preheated combustion air are supplied to the furnace by and in accordance with furnace temperature variations, and modifying the ratio of said rates by and in accordance with variations in the composition of the combustion gases.

3. A method of regulating the ratio of combustion air to fuel supplied for combustion by and in accordance with the thermal conductivity of the combustion gases which consists in decreasing said ratio when said conductivity is within a range intermediate the conductivity of the gases when they include a significant amount of unburned combustible and a predetermined lower conductivity, and in increasing said ratio when the thermal conductivity of the gases is below or above said range.

4. In control apparatus, the combination with an element adapted to deflect along a path, of means for deflecting said element in accordance with variations in the thermal conductivity of gases formed by the combustion of fuel, and means responsive to the deflection of said element and thereby actuated to increase the ratio of the fuel to the air supplied for its combustion when said element is within an intermediate portion of its path of deflection and to decrease said ratio when said element is within either of the two sections of said path separated by said intermediate section.

5. In a furnace control system, the combination of a fuel regulator and an air regulator, a reversible electric motor for adjusting said air regulator, control means for said motor comprising an electric bridge circuit, first and second adjustable elements, each adapted to unbalance said bridge circuit on its adjustment, a third adjustable element adapted by its adjustment to neutralize the unbalancing effects, of the first and second element adjustments, means responsive to a furnace load condition for effecting corrective adjustments of said fuel regulator and said first element, means responsive to variations in the composition of the furnace gases of combustion for effecting corresponding adjustments of said second element, means through which the actuation of said motor effects a corresponding adjustment of said third element, and means responsive to unbalance in said circuit for actuating said motor to the extent required to rebalance said control system.

6. The combination with a furnace, of fuel and air regulators respectively regulating the supplies of fuel and combustion air to the furnace, means responsive to a furnace load condition for adjusting said fuel regulator in accordance with variations in said condition, an electric motor for actuating said air regulator, means responsive to the composition of the furnace gases of combustion, an element adjusted by the last mentioned means in accordance with variations in said composition, a second element adjusted in accordance with the adjustment of the fuel regulator, a third element, means for adjusting the latter in accordance with the extent of operation of said motor, means cooperating with said elements to form a control circuit for said motor energizing the latter for actuation as required to maintain said composition practically constant.

7. The combination with a furnace, of fuel and air regulators respectively regulating the supplies of fuel and combustion air to the furnace, each of said regulators including a reversible electric actuating motor, means responsive to a furnace load condition for actuating the fuel regulator motor in response to variations in said condition, means responsive to the composition of the furnace combustion gases, and control means for said air regulator motor comprising an electric bridge circuit, means through which unbalance in said circuit actuates the last mentioned motor, a first adjustable element adjusted by the first mentioned means and adapted by its adjustment to subject said bridge circuit to an unbalancing effect, a second adjustable element adjusted by the second mentioned means and adapted by its adjustment to subject said bridge circuit to an unbalancing effect, and a third adjustable element adjusted in accordance with the extent of actuation of the air regulator motor and adapted by its adjustment to rebalance said control system.

8. In a control system, means responsive to variations in a controlling condition as the latter varies through an elongated range intermediate two predetermined values and through an end range at each side of the first mentioned range, a first control switch actuated by said means as said condition passes from said intermediate range into one of said end ranges, a second switch actuated by said means as said condition passes from the last mentioned range into said intermediate range, and a third switch actuated by said means as said condition passes into the second end range, and means for producing a control effect of one kind when either the first or third switches is actuated and for producing a control effect of the opposite kind when the second switch is actuated.

9. In a control system, means responsive to variations in a controlling condition as the latter varies through an elongated range intermediate two predetermined values and through an end range at each side of the first mentioned range, a first control switch actuated by said means as said condition passes from said intermediate range into one of said end ranges, a second switch actuated by said means as said condition passes from the last mentioned range into said intermediate range and a third switch actuated by said means as said condition passes into the second end range, a control motor normally adapted to be actuated in one direction or the other on the actuation of the first or second switch, respectively, and means through which the actuation of the third switch prevents actuation of said motor in the direction in which it is normally actuated on the actuation of said second switch.

10. In a furnace control system, the combination of a fuel regulator and an air regulator, a reversible electric motor for adjusting said air regulator, control means for said motor comprising an electric bridge circuit, first and second adjustable elements, each adapted to unbalance said bridge circuit on its adjustment, and a third adjustable element adapted by its adjustment to neutralize the unbalancing effect of each or both of the first and second element adjustments, means responsive to a furnace load condition for effecting a corrective adjustment of said fuel regulator and for effecting a corresponding adjustment of said first element, a reversible reset motor for adjusting said second element, controlling means for said reset motor responsive to variations in the composition of the furnace gases of combustion and actuating said reset motor to effect corresponding adjustments of said second element, and means responsive to unbalance in said circuit for actuating the first mentioned motor to adjust said third element and rebalance said control system.

11. In a furnace control system, the combination of a fuel regulator and an air regulator, a reversible electric motor for adjusting said air regulator, control means for said motor comprising an electric bridge circuit, first and second adjustable elements, each adapted to unbalance said bridge circuit on its adjustment, and a third adjustable element adapted by its adjustment to neutralize the unbalancing effect of each or both of the first and second element adjustments, means responsive to a furnace load condition for effecting a corrective adjustment of said fuel regulator and for effecting a corresponding adjustment of said first element, a reversible reset motor for adjusting said second element, controlling means for said reset motor responsive to variations in the thermal conductivity of the furnace gases of combustion and actuating said reset motor to effect corresponding adjustments of said second element when the thermal conductivity is below a predetermined value, means responsive to unbalance in said circuit normally operative to actuate the first mentioned motor to adjust said third element and rebalance said control system, and means operating independently of the last mentioned means through which said controlling means effects adjustment of said air regulator when the thermal conductivity exceeds said value.

12. In a furnace control system, the combination of a fuel regulator and an air regulator, a reversible electric motor for adjusting said air regulator, control means for said motor comprising an electric bridge circuit, first and second adjustable elements, each adapted to unbalance said bridge circuit on its adjustment, and a third adjustable element adapted by its adjustment to neutralize the unbalancing effect of each or both of the first and second element adjustments, means responsive to a furnace load condition for effecting a corresponding adjustment of said first element, a reversible reset motor for adjusting said second element, controlling means for said reset motor responsive to variations in the thermal conductivity of the furnace gases of combustion and actuating said reset motor to effect corresponding adjustments of said second element when the thermal conductivity is below a predetermined value, means responsive to unbalance in said circuit normally operative to actuate the first mentioned motor to adjust said third element and rebalance said control system, and means operating independently of the last mentioned means through which said controlling means actuates the first mentioned motor when the thermal conductivity exceeds said value.

13. In a furnace control system, the combination of a fuel regulator and an air regulator, a reversible electric motor for adjusting said air regulator, control means for said motor comprising an electric bridge circuit, first and second adjustable elements, each adapted to unbalance said bridge circuit on its adjustment, and a third adjustable element adapted by its adjustment to netralize the unbalacing effect of each or both of the first and second element adjustments, means responsive to a furnace load condition for effecting a corrective adjustment of said fuel regulator and for effecting a corresponding adjustment of said first element, a reversible reset motor for adjusting said second element, means responsive to variations in the thermal conductivity of the furnace gases of combustion, switch means through which the last mentioned means operates said reset motor in one direction or the other as the thermal conductivity rises above or falls below a predetermined value and prevents operation of said motor in said one direction when the thermal conductivity exceeds a certain value higher than said predetermined value, and means responsive to unbalance in said circuit for actuating the first mentioned motor to adjust said third element and rebalance said control system.

14. In a furnace control system, the combination of a fuel regulator and an air regulator, a reversible electric motor for adjusting said air regulator, control means for said motor comprising an electric bridge circuit, first and second adjustable elements, each adapted to unbalance said bridge circuit on its adjustment, and a third adjustable element adapted by its adjustment to neutralize the unbalancing effect of each or both of the first and second element adjustments, means responsive to a furnace load condition for effecting a corrective adjustment of said fuel regulator and for effecting a corresponding adjustment of said first element, a reversible reset motor for adjusting said second element, controlling means for said motor responsive to variations in the thermal conductivity of the furnace gases of combustion, switch means through which said responsive means operates said reset motor in one direction or the other as the thermal conductivity rises above or falls below a predetermined value and prevents operation of said motor in said one direction when the thermal conductivity exceeds a certain value higher than said predetermined value, means responsive to unbalance in said circuit for actuating the first mentioned motor to adjust said third element to rebalance said control system, and means operating independently of the last mentioned means through which said controlling means adjusts said air regulator when the thermal conductivity exceeds said predetermined value.

15. In a furnace control instrument, a measuring element adapted to deflect in response to variations in a furnace gas composition along a path comprising two end sections, an intermediate section and a control portion between each end section and said intermediate section and shorter than each of said sections and a control means actuated by the deflection of said element through either of said control portions, in one sense when said element is deflecting away from said intermediate section and in the reverse sense when said element is deflecting toward said intermediate section, and being unaffected by the deflection of said element through said intermediate section.

16. In a control instrument, a measuring element adapted to deflect in response to variations in a controlling condition along a path comprising two end sections, an intermediate section and a control portion between each end section and said intermediate section and shorter than each of said sections, and control means including one control device actuated by said element as the latter deflects through one of said control portions, a second device actuated by said element as the latter moves through the second of said control portions and means cooperating with said devices to produce a control action in one direction on the deflection of said element away from said intermediate section through either of said control portions and to produce a control action in the opposite direction on a deflection of said element into said intermediate section from either of said end sections through the control portions of its path.

ANKER E. KROGH.